United States Patent
Bruder et al.

(10) Patent No.: US 12,521,587 B2
(45) Date of Patent: Jan. 13, 2026

(54) ELECTRICAL POWER GENERATION AND ARCHITECTURE STRUCTURE FOR CONTROLLING AN ACOUSTIC FIRE SUPPRESSION SYSTEM

(71) Applicant: Incaendium Initiative Corporation, Cleveland, OH (US)

(72) Inventors: Geoffrey Adam Bruder, Rocky River, OH (US); Michael Steven Thomas, St. Albans, VT (US)

(73) Assignee: Incaendium Initiative Corporation, Cleveland, OH (US)

( * ) Notice: Subject to any disclaimer, the term of this patent is extended or adjusted under 35 U.S.C. 154(b) by 268 days.

(21) Appl. No.: 18/118,679

(22) Filed: Mar. 7, 2023

(65) Prior Publication Data
US 2023/0277886 A1    Sep. 7, 2023

Related U.S. Application Data

(60) Provisional application No. 63/317,506, filed on Mar. 7, 2022.

(51) Int. Cl.
| | |
|---|---|
| *A62C 99/00* | (2010.01) |
| *A62C 3/04* | (2006.01) |
| *H02N 11/00* | (2006.01) |

(52) U.S. Cl.
CPC .............. *A62C 99/009* (2013.01); *A62C 3/04* (2013.01); *H02N 11/002* (2013.01)

(58) Field of Classification Search
CPC ....... A62C 37/00; A62C 37/04; A62C 99/009; H02N 11/002

USPC ...................................................... 169/53, 62
See application file for complete search history.

(56) References Cited

U.S. PATENT DOCUMENTS

| | | |
|---|---|---|
| 3,617,899 A | 11/1971 | Goncharoff et al. |
| 4,021,982 A | 5/1977 | Kotcharian |
| 4,637,472 A | 1/1987 | Decima |
| 5,312,069 A | 5/1994 | Bollinger et al. |
| 5,320,305 A | 6/1994 | Oatway et al. |
| 6,311,780 B1 | 11/2001 | Zuev et al. |
| 6,478,240 B1 | 11/2002 | Dorkin et al. |
| 6,558,785 B1 | 5/2003 | Rawal et al. |

(Continued)

FOREIGN PATENT DOCUMENTS

| | | |
|---|---|---|
| CN | 103278331 A | 9/2013 |
| CN | 205391536 U | 7/2016 |

(Continued)

OTHER PUBLICATIONS

Amit Malewar. A Sonic Fire Extinguisher Extinguish Fire by Sound Waves. Tech Explorist. Published online Jan. 16, 2017.

(Continued)

*Primary Examiner* — Steven J Ganey
(74) *Attorney, Agent, or Firm* — Gesmer Updegrove LLP (57) ABSTRACT

An electrical scheme and architecture intended for a Fire Suppression System utilizing resonant or impulsive acoustic waves. The system is capable of surviving within an active wildfire environment and harvesting energy from the fire to power itself or actively diverting thermal energy for temporary cooling. The electrical systems optimize and modulate the fire suppression acoustic wave output for the changing ambient environment and actively tune the system to reduce power requirements.

14 Claims, 10 Drawing Sheets

(56) References Cited

U.S. PATENT DOCUMENTS

| | | |
|---|---|---|
| 6,629,670 B1 | 10/2003 | Shah |
| 6,796,382 B2 | 9/2004 | Kaimart |
| 6,843,447 B2 | 1/2005 | Morgan |
| 6,871,802 B2 | 3/2005 | Stilwell et al. |
| 6,969,546 B2 | 11/2005 | Dichiara, Jr. |
| 7,083,000 B2 | 8/2006 | Edwards et al. |
| 7,090,029 B2 | 8/2006 | Cleary et al. |
| 7,121,353 B2 | 10/2006 | Setzer |
| 7,210,537 B1 | 5/2007 | McNeil |
| 7,261,165 B1 | 8/2007 | Black |
| 7,284,727 B2 | 10/2007 | Nolan |
| 7,337,156 B2 | 2/2008 | Wippich |
| 7,377,469 B2 | 5/2008 | Cherian |
| 7,410,122 B2 | 8/2008 | Robbins et al. |
| 7,478,680 B2 | 1/2009 | Sridharan et al. |
| 7,857,254 B2 | 12/2010 | Parks |
| 7,975,774 B2 | 7/2011 | Akcasu |
| 8,181,903 B2 | 5/2012 | Posva |
| 8,236,413 B2 | 8/2012 | Rivers et al. |
| 8,376,059 B2 | 2/2013 | Reilly et al. |
| 8,678,314 B2 | 3/2014 | Martino et al. |
| 8,714,491 B2 | 5/2014 | Simon et al. |
| 8,746,355 B2 | 6/2014 | Demmitt |
| 8,820,421 B2 | 9/2014 | Rahgozar |
| 8,974,891 B2 | 3/2015 | Riedell |
| 9,017,792 B2 | 4/2015 | Liu et al. |
| 9,051,063 B1 | 6/2015 | Blosser et al. |
| 9,096,314 B2 | 8/2015 | Brotherton-Ratcliffe et al. |
| 9,120,570 B2 | 9/2015 | Hoisington et al. |
| 9,163,581 B2 | 10/2015 | Dyson et al. |
| 9,347,756 B2 | 5/2016 | Sager et al. |
| 9,393,450 B2 | 7/2016 | Schueller |
| 9,555,886 B1 | 1/2017 | Hawass |
| 9,586,700 B2 | 3/2017 | Helou, Jr. |
| 9,656,769 B2 | 5/2017 | Mazed et al. |
| 9,713,912 B2 | 7/2017 | Lee |
| 9,714,090 B2 | 7/2017 | Frolov et al. |
| 9,750,963 B2 | 9/2017 | Nelson |
| 9,757,918 B2 | 9/2017 | Hillier |
| 9,764,839 B2 | 9/2017 | Whitaker et al. |
| 9,783,291 B2 | 10/2017 | Kummer et al. |
| 9,871,186 B1 | 1/2018 | Dyson et al. |
| 9,907,987 B1 | 3/2018 | Hossameldin et al. |
| 10,040,547 B1 | 8/2018 | Pedigo |
| 10,040,553 B2 | 8/2018 | Frolov et al. |
| 10,246,184 B2 | 4/2019 | Ragland |
| 10,368,401 B2 | 7/2019 | Wen et al. |
| 10,377,558 B2 | 8/2019 | Williams |
| 10,427,785 B2 | 10/2019 | Needham et al. |
| 10,495,028 B1 | 12/2019 | Sipperley et al. |
| 10,501,180 B2 | 12/2019 | Yu |
| 10,569,115 B2 | 2/2020 | Tran et al. |
| 10,639,956 B2 | 5/2020 | Cantrell et al. |
| 10,710,735 B2 | 7/2020 | Murrow |
| 10,737,797 B2 | 8/2020 | Murrow et al. |
| 10,822,101 B2 | 11/2020 | Murrow et al. |
| 10,875,642 B2 | 12/2020 | Kita |
| 11,001,377 B1 | 5/2021 | Robinson et al. |
| 11,034,443 B2 | 6/2021 | Frolov et al. |
| 11,040,779 B2 | 6/2021 | Murrow et al. |
| 11,053,014 B2 | 7/2021 | Murrow et al. |
| 11,072,423 B1 | 7/2021 | Robertson et al. |
| 11,077,939 B1 | 8/2021 | Robertson et al. |
| 11,077,951 B1 | 8/2021 | Robertson et al. |
| 11,084,573 B1 | 8/2021 | Robertson et al. |
| 11,084,595 B2 | 8/2021 | Murrow |
| 11,117,675 B2 | 9/2021 | Murrow et al. |
| 11,117,676 B2 | 9/2021 | Murrow et al. |
| 11,124,306 B2 | 9/2021 | Murrow et al. |
| 11,124,307 B2 | 9/2021 | Murrow et al. |
| 11,124,308 B2 | 9/2021 | Murrow et al. |
| 11,142,302 B1 | 10/2021 | Robertson et al. |
| 11,148,797 B1 | 10/2021 | Robertson et al. |
| 11,167,839 B2 | 11/2021 | Robertson et al. |
| 11,167,844 B2 | 11/2021 | Ivans et al. |
| 11,174,020 B2 | 11/2021 | Robertson et al. |
| 11,180,241 B2 | 11/2021 | Robertson et al. |
| 11,279,479 B2 | 3/2022 | Robertson et al. |
| 11,325,698 B2 | 5/2022 | Millhouse |
| 11,325,699 B2 | 5/2022 | Robertson et al. |
| 11,358,714 B2 | 6/2022 | Bender et al. |
| 11,370,557 B2 | 6/2022 | Bender |
| 11,505,087 B2 | 11/2022 | Michael |
| 11,597,510 B2 | 3/2023 | Robertson et al. |
| 11,866,164 B2 | 1/2024 | Winkelstein |
| 11,964,753 B2 | 4/2024 | Merdinger |
| 11,993,361 B2 | 5/2024 | Parks |
| 12,347,414 B2 | 7/2025 | Gao |
| 2004/0069505 A1 | 4/2004 | Griffin |
| 2004/0245374 A1 | 12/2004 | Morgan |
| 2005/0139363 A1 | 6/2005 | Thomas |
| 2005/0214067 A1 | 9/2005 | Cherian |
| 2006/0005974 A1 | 1/2006 | Setzer |
| 2006/0162940 A1 | 7/2006 | Pohler |
| 2007/0034387 A1 | 2/2007 | Andersen et al. |
| 2007/0057113 A1 | 3/2007 | Parks |
| 2007/0215748 A1 | 9/2007 | Robbins et al. |
| 2007/0246601 A1 | 10/2007 | Layton |
| 2008/0078563 A1 | 4/2008 | Hock et al. |
| 2008/0271900 A1 | 11/2008 | Korenkov et al. |
| 2009/0008510 A1 | 1/2009 | Posva |
| 2009/0120653 A1 | 5/2009 | Thomas |
| 2009/0288711 A1 | 11/2009 | Alvi |
| 2009/0321094 A1 | 12/2009 | Thomas |
| 2010/0059236 A1 | 3/2010 | Yee |
| 2010/0065288 A1* | 3/2010 | Akcasu ............... A62C 3/025 169/53 |
| 2010/0181081 A1 | 7/2010 | Reilly et al. |
| 2010/0203460 A1 | 8/2010 | Formigoni |
| 2013/0125621 A1 | 5/2013 | Puget et al. |
| 2015/0114672 A1 | 4/2015 | Yee |
| 2015/0139363 A1 | 5/2015 | Lin et al. |
| 2016/0009387 A1 | 1/2016 | Kummer et al. |
| 2016/0082298 A1 | 3/2016 | Dagenhart |
| 2016/0265441 A1 | 9/2016 | Pierick et al. |
| 2016/0368600 A1 | 12/2016 | Frolov et al. |
| 2017/0007865 A1 | 1/2017 | Dor-El et al. |
| 2017/0043872 A1 | 2/2017 | Whitaker et al. |
| 2017/0098748 A1 | 4/2017 | Steutermann |
| 2017/0129699 A1 | 5/2017 | Scofield |
| 2017/0144003 A9 | 5/2017 | Willner |
| 2017/0158322 A1 | 6/2017 | Ragland |
| 2017/0160740 A1 | 6/2017 | Srivastava et al. |
| 2017/0216646 A1 | 8/2017 | Casamento |
| 2017/0259098 A1 | 9/2017 | Tran et al. |
| 2017/0274996 A1 | 9/2017 | Frolov et al. |
| 2018/0079888 A1 | 3/2018 | Wiklund et al. |
| 2018/0099168 A1 | 4/2018 | Willner |
| 2018/0124945 A1 | 5/2018 | Quenard et al. |
| 2018/0251632 A1 | 9/2018 | Chaffey et al. |
| 2018/0354617 A1 | 12/2018 | Frolov et al. |
| 2018/0369625 A1 | 12/2018 | Sandahl et al. |
| 2019/0061932 A1 | 2/2019 | Kita |
| 2019/0068108 A1 | 2/2019 | Uno et al. |
| 2019/0094861 A1 | 3/2019 | Menzel et al. |
| 2019/0127062 A1 | 5/2019 | Witmer |
| 2019/0168038 A1 | 6/2019 | Lian et al. |
| 2019/0185163 A1 | 6/2019 | Thomas |
| 2019/0337620 A2 | 11/2019 | Thomas |
| 2019/0352004 A9 | 11/2019 | Frolov et al. |
| 2020/0009974 A1 | 1/2020 | Bender et al. |
| 2020/0009989 A1 | 1/2020 | Michael |
| 2020/0010185 A1 | 1/2020 | Bender |
| 2020/0010186 A1 | 1/2020 | Bender et al. |
| 2020/0010209 A1 | 1/2020 | Bender |
| 2020/0055596 A1 | 2/2020 | Millhouse |
| 2020/0091840 A1 | 3/2020 | Dhyllon |
| 2020/0130831 A1 | 4/2020 | Luca |
| 2020/0140087 A1 | 5/2020 | Fulbright |
| 2020/0247536 A1 | 8/2020 | Mokhtarian et al. |
| 2021/0053694 A1 | 2/2021 | Winkelstein |
| 2021/0339866 A1* | 11/2021 | Thomas ............... B64D 1/16 |

(56) References Cited

U.S. PATENT DOCUMENTS

| | | |
|---|---|---|
| 2021/0362836 A1 | 11/2021 | Parks |
| 2022/0081107 A1 | 3/2022 | Merdinger |
| 2023/0277885 A1 | 9/2023 | Bruder et al. |

FOREIGN PATENT DOCUMENTS

| | | |
|---|---|---|
| CN | 105816981 A | 8/2016 |
| CN | 105833446 A | 8/2016 |
| CN | 105903137 A | 8/2016 |
| CN | 205802476 U | 12/2016 |
| CN | 205891227 U | 1/2017 |
| CN | 106370771 A | 2/2017 |
| CN | 107007961 A | 8/2017 |
| CN | 107376154 A | 11/2017 |
| CN | 207342072 U | 5/2018 |
| CN | 108853855 A | 11/2018 |
| CN | 109224351 A | 1/2019 |
| CN | 109833575 A | 6/2019 |
| CN | 108837345 B | 7/2020 |
| DE | 102011003233 A1 | 8/2012 |
| EP | 1716890 A1 | 11/2006 |
| FR | 3020622 A1 | 11/2015 |
| JP | 2000-093536 A | 4/2000 |
| JP | 2003-339898 A | 12/2003 |
| JP | 2011-103564 A | 5/2011 |
| JP | 2013-531789 A | 8/2013 |
| JP | 5323122 B2 | 10/2013 |
| KR | 10-2018-0002453 A | 1/2018 |
| KR | 10-1881550 B1 | 7/2018 |
| TW | 201002383 A | 1/2010 |
| WO | 98/32495 A1 | 7/1998 |
| WO | 02/18016 A1 | 3/2002 |
| WO | 2016/086068 A1 | 6/2016 |
| WO | 2018/065816 A1 | 4/2018 |

OTHER PUBLICATIONS

Doig et al. Shock Wave Interaction with a Flame. 18th Australasian Fluid Mechanics Conference, 2012.

Hallmark, Using Backpack Leaf Blowers on Grass Fires, https://www.firefighternation.com/leadership/using-backpack-leaf-blowers-on-grass-fires/#gref, published Sep. 18, 2011, retrieved on Aug. 11, 2023, 11 pages.

Hamood et al. Two-Stage Thermoacoustic Electricity Generator for Waste Heat Recovery. Proceedings of the World Congress on Engineering, vol. II, 2016.

IFEX I litre impulse firefighting gun 3001: https://www.ifex3000.com/en.impulse-firefighting-gun/1-litre-impulse-firefighting-gun-3001/ Retrieved on Oct. 26, 2003, published Jun. 5, 2016 as per Wayback machine, 3 pages.

International Preliminary Report on Patentability received for PCT Patent Application No. PCT/US2018/065816, mailed on Jun. 25, 2020, 5 pages.

International Preliminary Report on Patentability received for PCT Patent Application No. PCT/US2023/014761, mailed on Sep. 19, 2024, 9 pages.

International Search Report and Written Opinion received for PCT Patent Application No. PCT/US2023/014761, mailed on Sep. 6, 2023, 9 pages.

Karodi et al. Quenching of flames by sound. International Journal of Advance Research and Innovative Ideas in Education, vol. 3, Issue 1, 2017.

Office Action received for European Application No. 18888147.8, mailed on Aug. 1, 2024, 4 pages.

PCT International Search Report, dated Feb. 22, 2019 for Adaptive Global Solutions, LLC, International Application No. PCT/US2018/065816, filed Dec. 14, 2018.

Christopher B. Scott, "Combustion, Respiration and Intermittent Exercise: A Theoretical Perspective on Oxygen Uptake and Energy Expenditure", Biology, vol. 3, No. 2, 2014, pp. 255-263.

International search Report and written opinion received for PCT application No. PCT/US25/26615, mailed on Jul. 2, 2025, 11 pages.

Office Action received for European Application No. 23767418.9, mailed on Oct. 15, 2024, 3 pages.

Office Action received for European Application No. 23847119.7, mailed on Feb. 18, 2025, 3 pages.

Office Action received for Finland Application No. 20246202, mailed on Apr. 8, 2025, 4 pages of Original Document only.

Office Action received for Great Britain Patent Application No. 2414652.4, mailed on Mar. 21, 2025, 6 pages.

* cited by examiner

ELECTRICAL POWER GENERATION AND ARCHITECTURE STRUCTURE FOR CONTROLLING AN ACOUSTIC FIRE SUPPRESSION SYSTEM

REFERENCE TO RELATED APPLICATIONS

This application claims priority to the U.S. provisional application No. 63/317,506 filed on Mar. 7, 2022.

SUMMARY OF THE INVENTION

Described herein is an Electrical Power Generation and Architecture Structure for Controlling an Acoustic Fire Suppression System. This system may be mounted statically or stationarily, deployed from a vehicle, or incorporated into a complete unmanned vehicle (which may be autonomous or remotely operated). The unmanned vehicle version of this technology may be ground based, aerial, or aquatic.

The Fire Suppression System is configured to survive within an active wildfire environment, and potentially harvest energy from the fire to power itself. The primary mode of fire suppression is a pressure impulse or acoustic wave generated within the Fire Suppression System, which may be called an "Acoustic Cannon."

The electrical systems may be designed to passively or actively control the acoustics and power generation. An active control configuration would require that the electrical components are cooled, whereas a passive control configuration may enable high temperature Silicon Carbide (SiC) components to be used, avoiding the need for cooling.

DETAILED DESCRIPTION OF PREFERRED EMBODIMENTS

Figure 1:
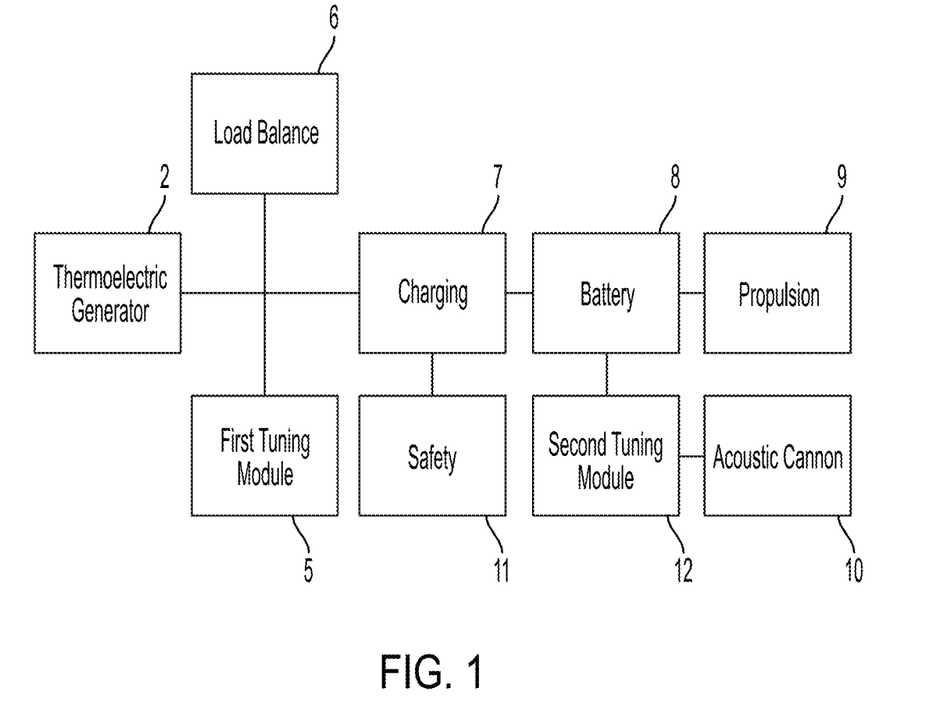
FIG. 1 is a block Diagram for Fire Suppression System with Thermoelectric Power Generation.
Figure 2:
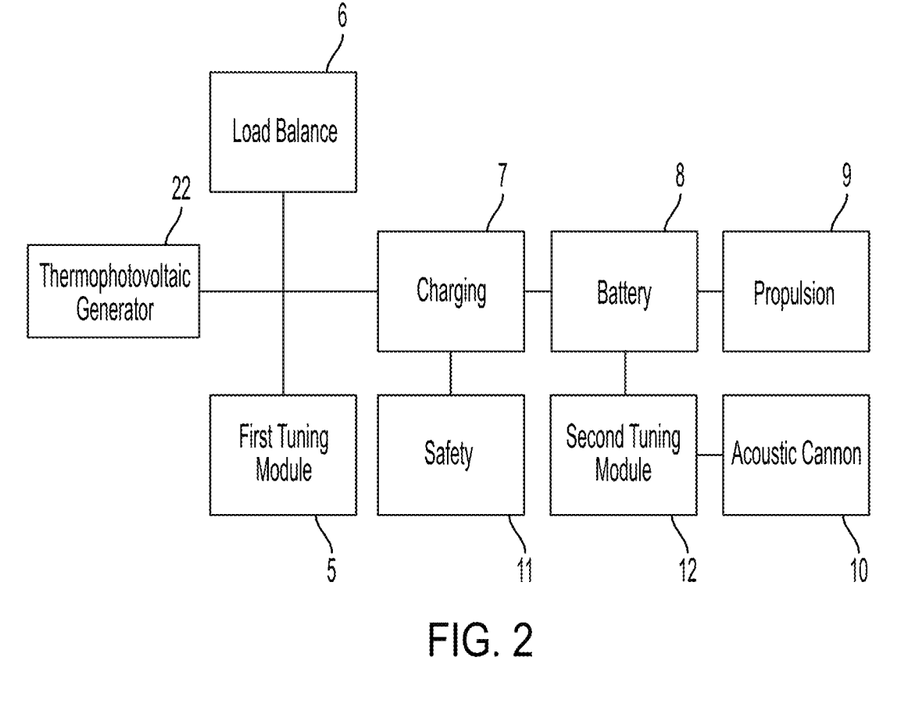
FIG. 2 is a block Diagram for Fire Suppression System with Thermophotovoltaic Power Generation.
Figure 3:
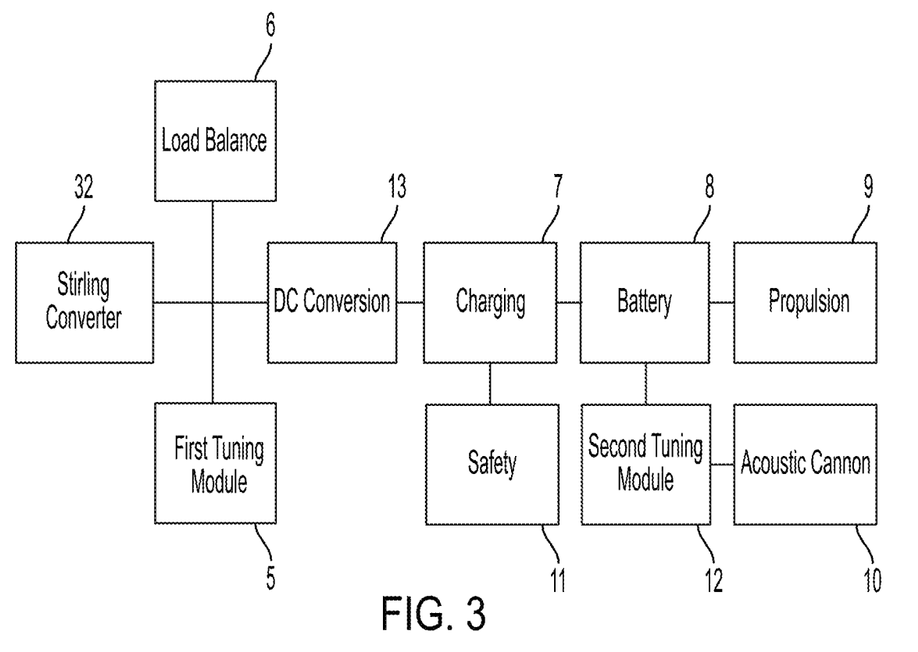
FIG. 3 is a block diagram for Fire Suppression System with Stirling Power Generation.

The Command Module is responsible for controlling the complete Fire Suppression System, and each of the subsystems including any combination of subsystems including onboard thermal energy conversion, power distribution, load balancing, battery charging with safeties, propulsion, navigation, communications, and tuning for energy harvesting and the fire suppression system, while ensuring that each of the subsystems interacts appropriately. FIG. 1, FIG. 2, and FIG. 3 show three variations of a portion of the Command Module block diagram which pertain to the power generation and distribution systems.

Figure 4:
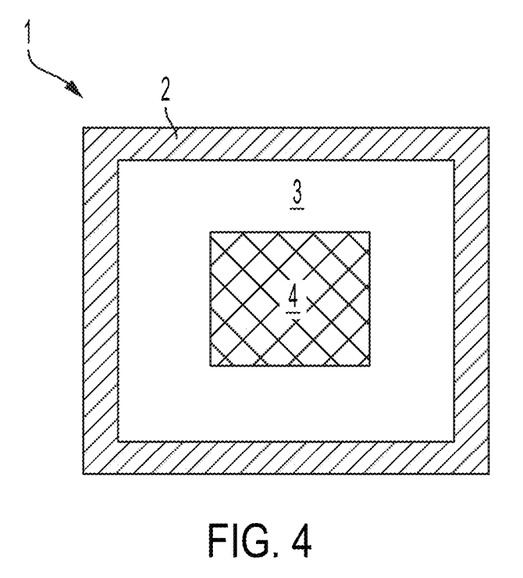
FIG. 4 is a block diagram of Electrical System Positioning Within System.
Figure 5:
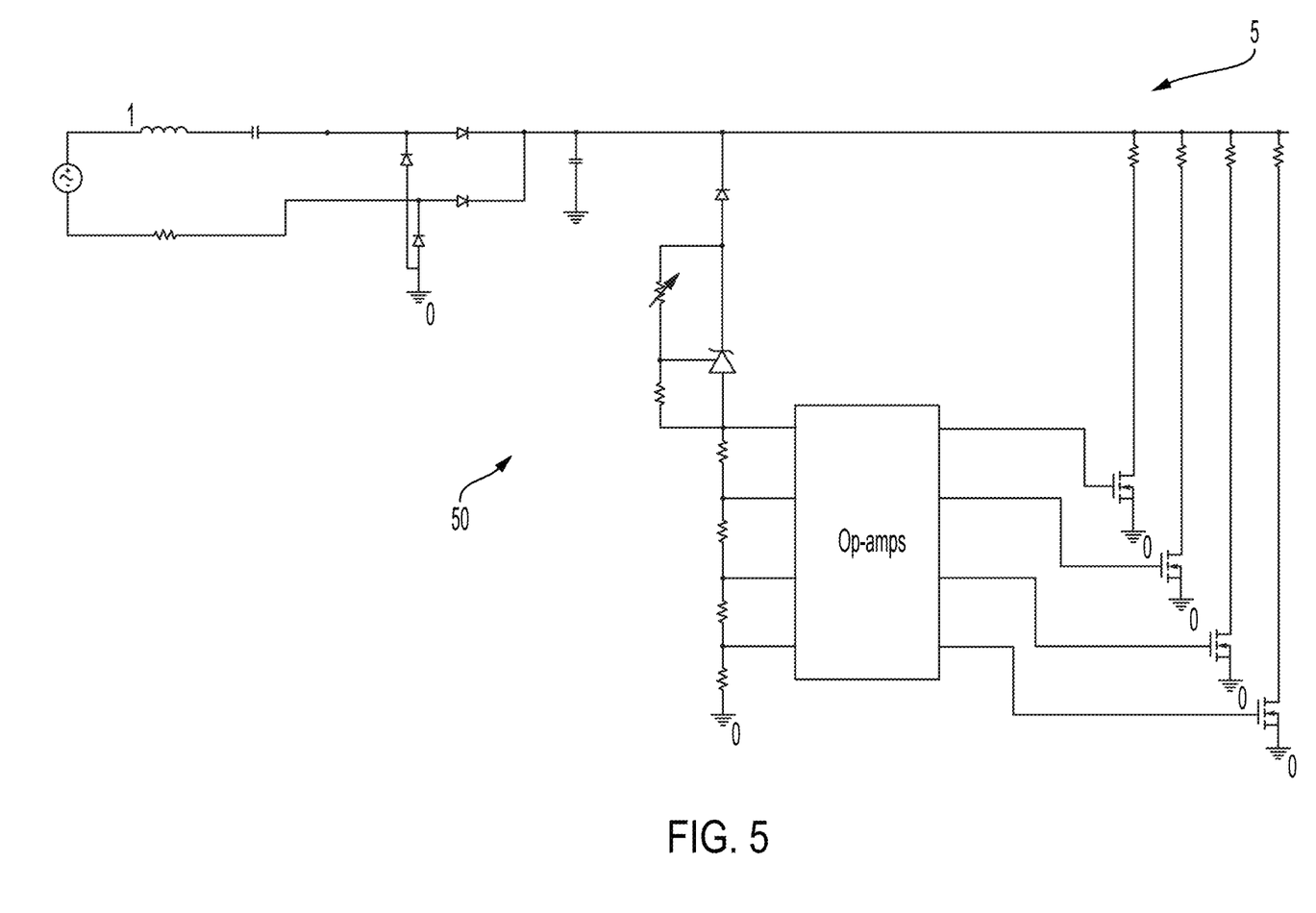
FIG. 5 is a schematic example of Zener Controller.
Figure 6A:
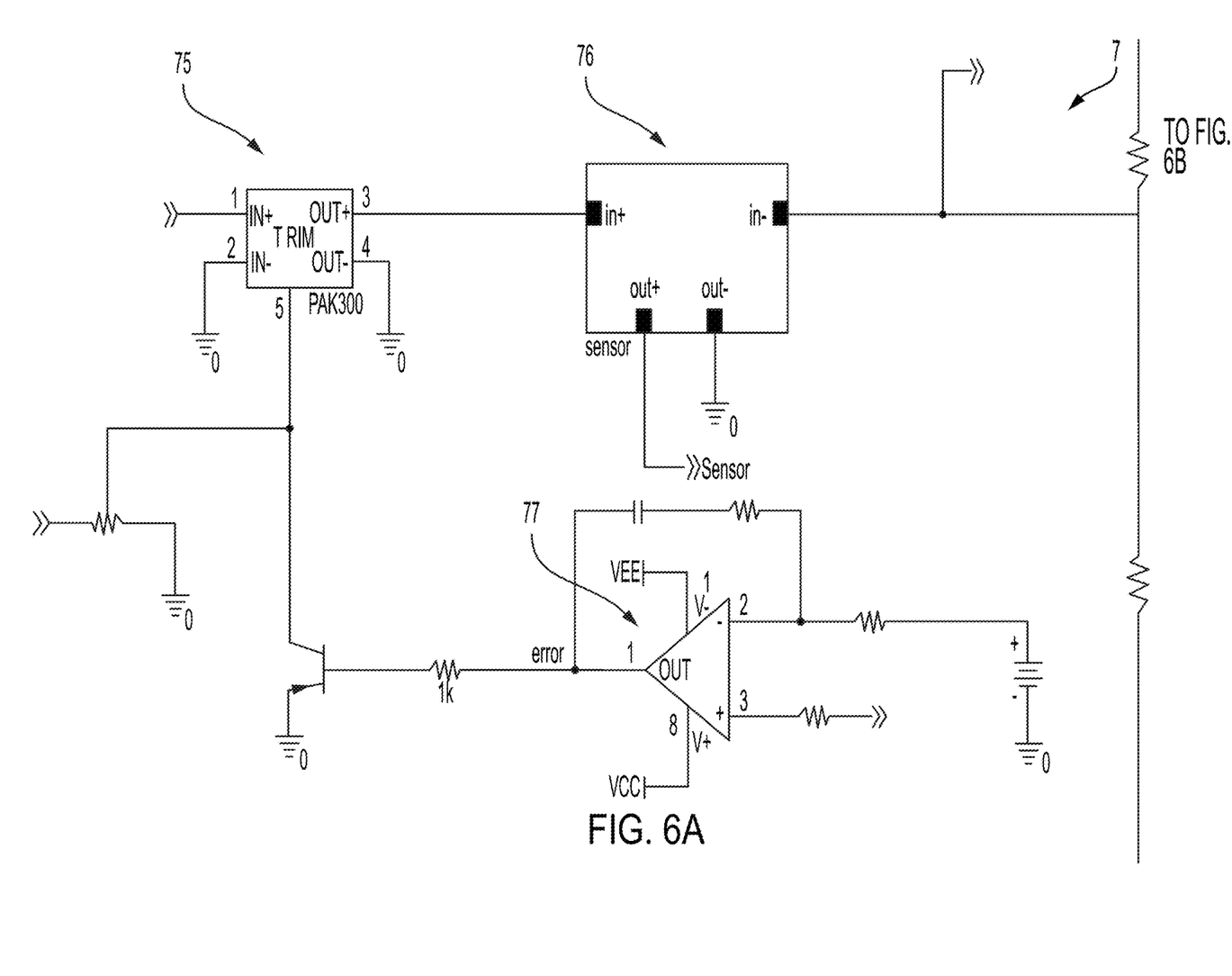
FIGS. 6A and 6B is a schematic example of a Battery Charging Circuit.
Figure 6B:
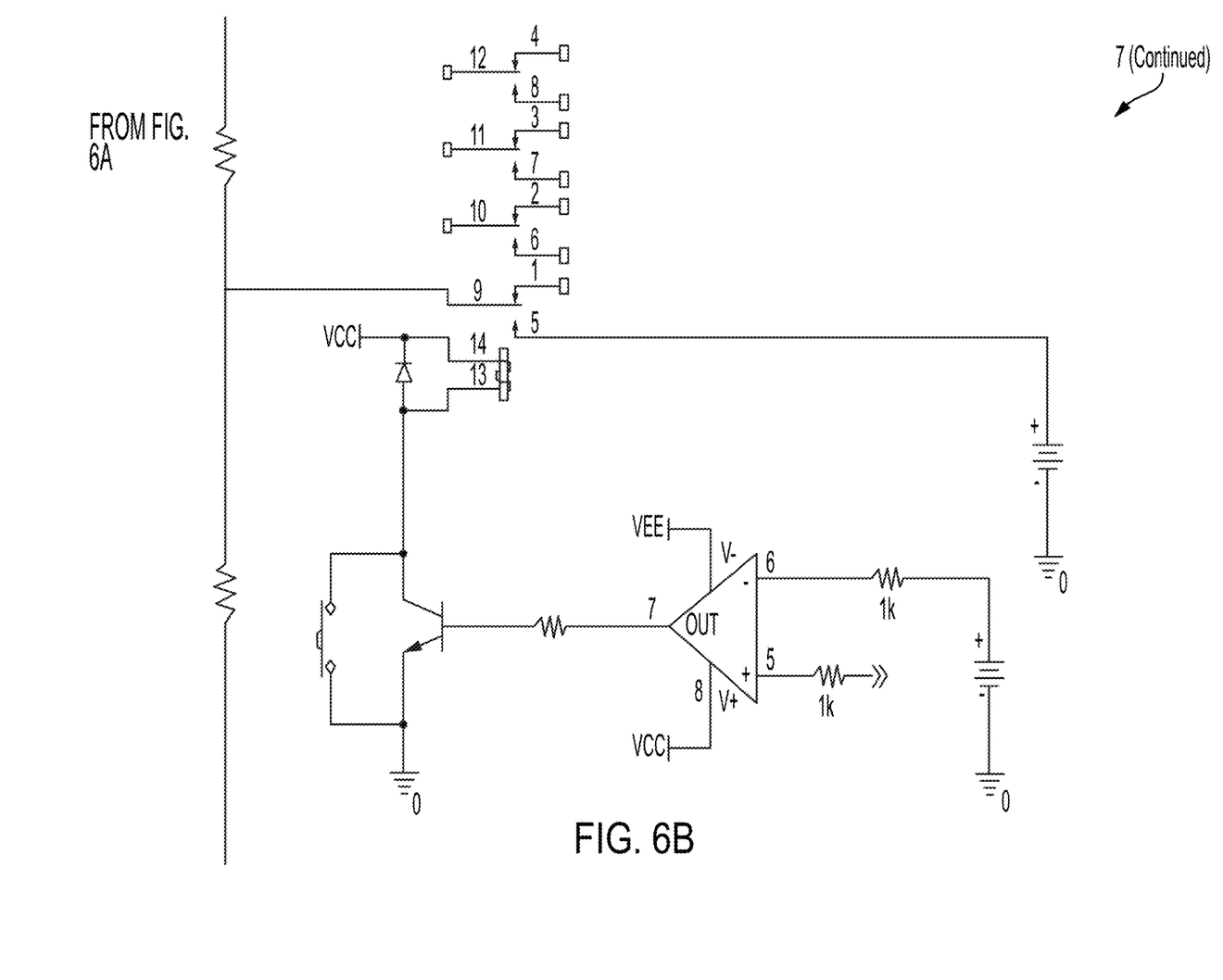
Figure 7:
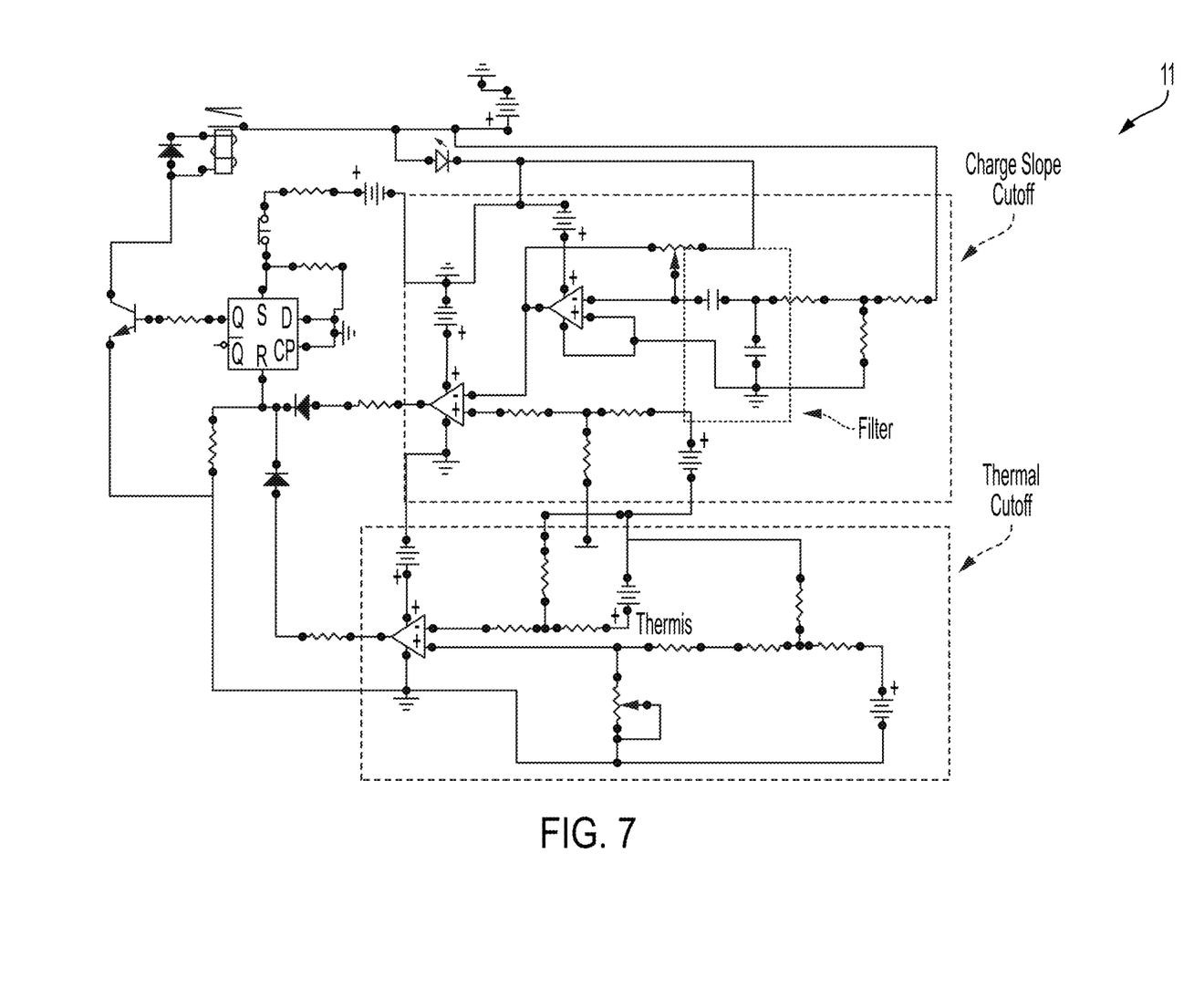
FIG. 7 is a schematic example of Safety Circuit.

One embodiment of the invention, shown in FIG. 1 and FIG. 4, utilizes a thermoelectric generator (2) as the thermal energy generation source for the system. In this embodiment of the invention, the hot side of the thermoelectric generator is sufficiently heated by the external ambient environment, such as in a wildfire (1) and the cold side of the thermoelectric generator is kept cold by a Coolant Storage Tank (3). A thermal gradient causes a Direct Current (DC) power output to the electrical system (4). Subsequently, as shown in FIG. 1, a first tuning module (5), located at the temperature-controlled interior of the system (FIG. 4), is utilized to vary the resistive load perceived by the thermoelectric generator (2). This optimizes the power output efficiency of the thermoelectric generator (2) based on the temperature gradient, the battery (8) charge level, and the load being drawn by the propulsion and fire suppression systems (9) and (10). The first tuning module (5), as shown in FIG. 1, senses the power input from the thermoelectric generator (2) and/or power output with a current sensor (76), as shown in the charging module (7) of FIGS. 6A and 6B, and adjusts the resistive load regularly to achieve peak current flow. The first tuning module (2) may be a Zener controller (50), as shown in FIG. 5, resistive load bank, or a variation of a trim pot that is adjustable electronically. The Zener controller (50) will utilize comparator circuits with operational amplifiers that add resistors as voltage limits are surpassed. A load balance module (6) is utilized as a method for adding a load above what is needed for optimal thermal to electric conversion to the thermoelectric generator if the battery (8), propulsion (9), and fire suppression systems (10) are not drawing enough power to maintain a safe temperature, around 850 C, for the hardware, and the hot end of the thermoelectric generator (2) from becoming too hot. A temperature feedback (not shown), utilizing temperature sensors such as thermocouples, infrared devices, or thermistors, is available to the Load Balance Module (6) for the autonomous determination of required load. The Charging Module (7) is shown in FIGS. 6A and 6B. This battery charging circuit utilizes a DC-DC convertor (75) to match the thermoelectric generator (2) output voltage with the optimal voltage for battery charging. The current sensor (76) works with the operational amplifiers in a comparator circuit (77) to maintain constant current in the charging cycle. The Safety Module (11) is shown in FIG. 7 disables battery charging if the battery (8) is fully charged, as determined by the slope of voltage change, or if the battery (8) is becoming overheated, such is determined by thermistors mounted to the battery (8). A second tuning module (12) is used to condition the power output from the battery (8) to the Acoustic Cannon (10). Power conditioning for the Acoustic Cannon (10) includes DC to AC conversion utilizing Pulse Width Modulation (PWM) at the operating frequency and is driven through a reactive power conditioner, a part of the second tuning module (12), shown in FIG. 1.

For optimal performance of a driver, the reactive power conditioner of the second tuning module (12) needs to provide the appropriate impedance, which essentially provides an electrical spring by shifting the voltage-current phasing in the Alternating Current (AC) through complex impedance. This electrical spring is called reactive power. The reactive power conditioner introduces the complex impedance is shown in Formula 1, where z is the impedance, x is the real resistance and y is the imaginary resistance, letting $j=\sqrt{-1}$:

$$z = x + jy \qquad \text{Formula 1:}$$

Figure 8:
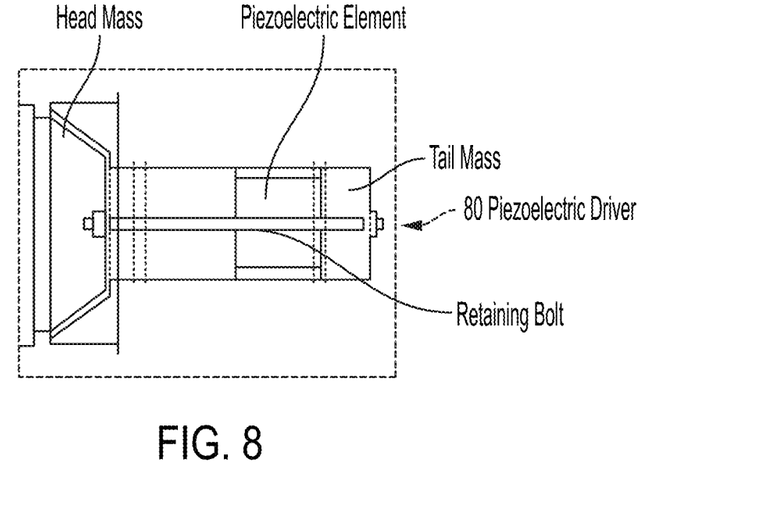
FIG. 8 is a schematic example of Piezoelectric Driver.
Figure 9:
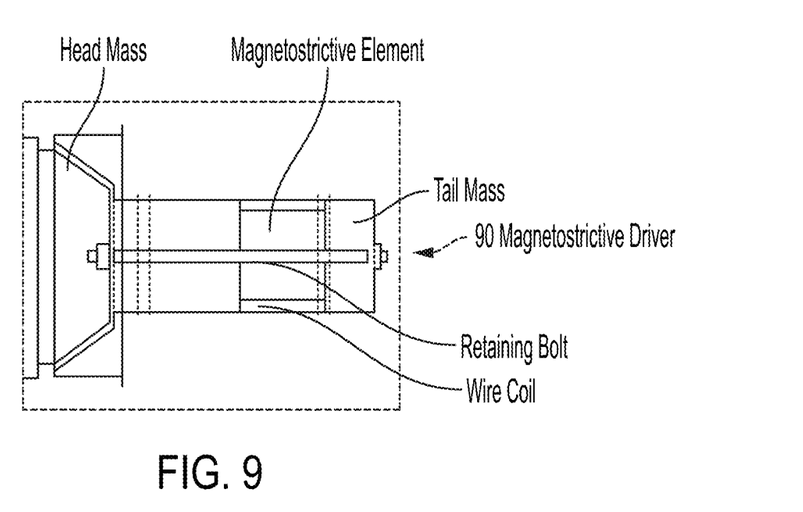
FIG. 9 is a schematic example of Magnetostrictive Driver.
Figure 10:
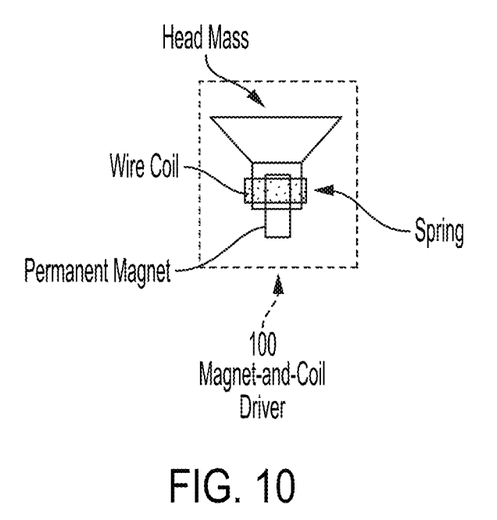
FIG. 10 is a schematic example of Electro-mechanical Driver.

The reactive power conditioner, a component of the second tuning module (12), is a capacitive element in the case of both an electro-mechanical driver (100) (FIG. 10) and magnetostrictive driver (90) (FIG. 9). Alternatively, the reactive power conditioner is an inductive element in the case of a Piezoelectric driver (80) (FIG. 8). The reactive power conditioner is meant to counteract the imaginary portion of the AC power signal. Operating frequency of the acoustic cannon (10) is determined using temperature and pressure sensors (not shown) to determine the appropriate wavelength in ambient conditions. Propulsion power is directed via the logic within the Command Module (not shown) and by using feedback from accelerometers (not shown) in the unit.

Alternatively, a thermal energy conversion system utilizing thermophotovoltaics may be used in place of the thermoelectric power generation, shown in FIG. 2. The thermophotovoltaic system (22) would function identically to the operation of the thermoelectric system, shown in FIG. 1, described above but would capture photons generated by the fire and convert them to usable electrical power, much like a high temperature solar cell.

In the case of a Stirling power generation, shown in FIG. 3, the electrical systems function identically to those of the Thermoelectric powered system, with a couple of exceptions. The power provided from a Stirling device, free-piston or thermoacoustic, would be provided in an AC signal and need to be converted to DC, as shown at 13 in FIG. 3. The tuning circuit (5) for the Stirling convertor (32) would consist of capacitors, rather than resistors. Furthermore, an active system cooling is achievable through a purposeful de-tuning of efficiency. If the thermal energy system hot end begins to reach an above-desired temperature as determined by a pre-programmed algorithm, the tuning circuit (5) can tune the impedance such that the system runs with lower thermal-to-electrical efficiency. The effect of this action is to force a larger heat flow through the thermal energy conversion device, consequently lowering the hot end temperature. This can allow a colder temperature operation, though power output would be restricted in this mode.

For the above-described control strategies, all active components would require cooling, which can easily be provided by the Coolant Storage Tank (4). However, this will limit the mission life. Alternatively, the above-described electrical components may be substituted for or comprise Silicon Carbide (SiC). Utilizing SiC components will increase the allowable working temperature within portions of the Command Module (not shown), reducing the amount of cooling required for the electrical systems and extending mission life.

Additional embodiments of the above-described control methodologies are achievable with active electrical systems, rather than passive elements. Namely, the tuning portions of the controller may be replaced with control logic that vary the voltage-current phasing to achieve changes in perceived impedance like capacitors or inductors. This method is known to those skilled in the art as synthetic capacitors or synthetic inductors but is novel in its use described herein.

What is claimed is:

1. A command module for controlling an acoustic fire suppression system, comprising:
    a battery charging circuit coupled to a battery;
    a thermal energy conversion system that converts energy from an ambient environment into power for use by the battery charging circuit to charge the battery; and
    a tuning circuit coupled to the battery for power conditioning of a DC power signal output from the battery to the acoustic fire suppression system,
    wherein the power conditioning includes DC to AC conversion of the DC power signal into an AC power signal utilizing pulse width modulation at an operating frequency of the acoustic fire suppression system and driving the AC power signal through a reactive power conditioner to counteract an imaginary portion of the AC power signal;
    wherein the reactive power conditioner is (i) a capacitive element where the acoustic fire suppression system includes any one of an electro-mechanical driver and a magnetostrictive driver, and wherein the reactive power conditioner is (ii) an inductive element where the acoustic fire suppression system includes a Piezoelectric driver.

2. The command module of claim 1, further comprising a further tuning circuit coupled to the thermal energy conversion system to vary a resistive load perceived by the thermal energy conversion system, wherein the further tuning circuit includes a Zener controller, resistive load bank, or a trim pot that is adjustable electronically.

3. The command module of claim 2, wherein the further tuning circuit senses the power from the thermal energy conversion system with a current sensor.

4. The command module of claim 1, further comprising a load balance circuit for adding a supplemental resistive load to the thermal energy conversion system to maintain a safe temperature of around 850° C., the load balance circuit using temperature feedback for autonomous determination of the supplemental resistive load.

5. The command module of claim 1,
    wherein the battery charging circuit includes a DC-DC convertor to match an output voltage of the thermal energy conversion system with an optimal voltage for charging the battery, and
    wherein the battery charging circuit further includes a current sensor which works with operational amplifiers in a comparator circuit to maintain a constant current during a charging cycle.

6. The command module of claim 1, further comprising temperature and pressure sensors for determining the operating frequency of the acoustic fire suppression system based on an appropriate wavelength in ambient conditions.

7. The command module of claim 1, further comprising accelerometers to direct the DC power signal output from the battery to the propulsion system based on acceleration data.

8. The command module of claim 1, wherein the thermal energy conversion system is a thermophotovoltaic generator.

9. The command module of claim 1, wherein the thermal energy conversion system is a thermoelectric generator.

10. The command module of claim 1, wherein the command module is implemented with silicon carbide (SiC) components.

11. The command module of claim 1, further comprising a safety module, the safety module comprising a circuit that disables battery charging if the battery is fully charged, as determined by a slope of voltage change, or if the battery is becoming overheated.

12. A command module for controlling an acoustic fire suppression system, comprising:
- a battery that outputs power to an acoustic fire suppression system and a propulsion system;
- a battery charging circuit that charges the battery;
- a thermal energy conversion system that converts energy from an ambient environment into power that is used by the battery charging circuit to charge the battery, wherein the thermal energy conversion system is one of a thermoelectric generator and a thermophotovoltaic generator;
- a load balance circuit for adding a supplemental resistive load to the thermal energy conversion system if the battery, the propulsion system, and the acoustic fire suppression systems are not drawing power sufficient to maintain an operating temperature at a hot end of the thermal energy conversion system that is no greater than 850° C., wherein the load balance circuit uses temperature feedback for autonomous determination of the supplemental resistive load.

13. A command module for controlling an acoustic fire suppression system, comprising:
- a battery and a battery charging circuit that charges the battery;
- a thermal energy conversion system that converts energy from an ambient environment into power that is used by the battery charging circuit to charge the battery, wherein the thermal energy conversion system is one of a thermoelectric generator and a thermophotovoltaic generator; and
- a safety module that disables the battery charging circuit if the battery is fully charged or if the battery is becoming overheated,
- wherein the battery charging circuit includes a DC-DC convertor to match an output voltage of the thermal energy conversion system with an optimal voltage for charging the battery, and
- wherein the battery charging circuit further includes a current sensor which works with operational amplifiers in a comparator circuit to maintain a constant current during a charging cycle.

14. A command module for controlling an acoustic fire suppression system, comprising:
- a battery charging circuit coupled to a battery;
- a thermal energy conversion system that converts energy from an ambient environment into power for use by the battery charging circuit to charge the battery; and
- a tuning circuit coupled to the battery for power conditioning of a DC power signal output from the battery to the acoustic fire suppression system, wherein the power conditioning includes DC to AC conversion of the DC power signal into an AC power signal utilizing pulse width modulation at an operating frequency of the acoustic fire suppression system; and
- temperature and pressure sensors for determining the operating frequency of the acoustic fire suppression system based on an appropriate wavelength in the ambient environment.

* * * * *